United States Patent Office 2,722,557
Patented Nov. 1, 1955

2,722,557
STABILIZED CHLORINATED PARAFFIN WAX

Robert C. Danison, Painesville, Ohio, assignor to Diamond Alkali Company, Cleveland, Ohio, a corporation of Delaware No Drawing. Application February 9, 1950,
Serial No. 143,360

11 Claims. (Cl. 260—652.5)

This invention relates to methods for the stabilization of normally solid highly chlorinated paraffin and to stabilized compositions of such material.

Highly chlorinated hydrocarbons, especially highly chlorinated paraffin waxes containing between 50% and 80% of chemically combined chlorine and being solids under normal conditions, may be prepared in a variety of ways but are most suitably prepared by dissolving the paraffin desired to be chlorinated in a solvent, such as carbon tetrachloride, and then contacting this solution with elemental chlorine, preferably in the presence of catalytically activating light. Upon the obtaining of the desired extent of chlorination, the carbon tetrachloride solution has usually become a highly viscous, sticky liquid. Various means may be resorted to to separate the solvent from the chlorinated paraffin, whereupon the chlorinated paraffin is ordinarily obtained as a resin-like, solid material, which may suitably be comminuted into powdered form. Such materials have various uses in the arts but are to a considerable extent limited in their applicability by instability at elevated temperatures, presumably arising from the loss of chlorine apparently but loosely held in the molecules which is evolved in the form of hydrogen chloride.

Sundry suggestions have heretofore been made for stabilization of such highly chlorinated paraffin materials, especially those having from 50% to 80% of chemically combined chlorine, these suggestions having included addition of various materials designed to prevent the evolution of hydrogen chloride, whatever the cause may be, from the materials when they are exposed to heat. These prior suggestions have failed of commercial applicability largely because, in fact, the temperature of stability of the material was not raised significantly by employment thereof.

The present invention contemplates a method for materially raising the stability temperature of highly chlorinated paraffin, such as chlorinated paraffin having from 50% to 80% of chemically combined chlorine and preferably chlorinated paraffin having from about 65% to about 75% of chemically combined chlorine, by addition thereto of a stabilizing substance, which addition may take place either in the separation stage of the chlorinated paraffin from its solvent or to the comminuted solid material after it has been separated from the solvent. Thus, the stabilizers of the present invention may be added to a solution of chlorinated paraffin prior to separation of the paraffin from its solvent as by steam distillation. The stabilizers may also be incorporated in the chlorinated paraffin by flashing the solvent from a hot bath of the stabilizer as described in my co-pending application of even date. The stabilizer may also be added to the solid recovered chlorinated paraffin and thoroughly mixed therewith.

In accordance with the present invention, substances chosen from the group of glycols, such as ethylene glycol and propylene glycol (1,2-dihydroxy propane), glycerol, pentaerythritol, pentoses, such as xylose, and hexoses, such as glucose, sorbose and mannose, are particularly useful in this connection and when combined with such chlorinated paraffin in amounts up to 5% thereof, are particularly effective.

Materials which may be stabilized in accordance with the present invention include chlorinated paraffins wherein the paraffin may suitably have from 18 to 36 carbon atoms in a straight or branched chain and suitably average of the order of 24 carbon atoms, which paraffins have a melting point of the general order of 48° C. to 68° C., suitably 51° C. to 55° C. As noted above, materials of this general character, when containing between 50% and 80% of chemically combined chlorine, are normally solids at conditions approaching normal conditions and especially where 65% to 75% of chemically combined chlorine is present, these materials are generally solids under ordinary conditions. A particularly suitable member of this class is chlorinated paraffin having from 69% to 71% of chlorine.

The stability of chlorinated paraffin of the general type under discussion may suitably be shown by submitting the materials to a standard test, the following conditions of test having been found suitable for comparison of stabilized and unstabilized materials:

A sample of solid chlorinated material is comminuted and placed in a closed test tube fitted with a gas inlet and an outlet tube and heated to a temperature of 175° C. for a period of four hours, during which time the test tube is constantly swept with a stream of dry nitrogen. During the heating period, the hydrogen chloride evolved from the sample is removed by the current of dry nitrogen and collected in a washing tower of caustic soda solution. By suitable titration the amount of HCl evolved may be determined. The rating given the material is based upon the percentage of the weight of the sample taken which is recovered as hydrogen chloride.

Chlorinated paraffin containing 70% of chemically combined chlorine and prepared by the method set forth above, and not stabilized in accordance with the present invention, normally has a rating in accordance with the above test of about 0.3%. This material is suitable for many uses in the arts where temperatures of the order of 150° C. and higher are not encountered, but when subjected to temperatures in excess of 150° C., as, for example, must be the case in combining chlorinated paraffin with thermoplastic materials which are subsequently to be molded at relatively high temperatures, the chlorinated paraffin is subject to discoloration and degradation and moreover, discolors the ultimate molding with a plastic, whereby its use in this connection is not indicated.

In contrast to these results obtained on prior art chlorinated paraffins, the method of the present invention produces compositions which have ratings in accordance with the above test of the order of 0.02% to 0.07%. Such materials are found to be stable at temperatures of the order of 230° C. and higher for periods of one-half hour or more without appreciable discoloration or other evidence of degradation. It will be appreciated that since the injection molding temperatures of, for example, polystyrene are normally less than 230° C. and moreover, since such temperatures are not endured by the material for more than a relatively short period of time, while in the injection molding machine, such stabilized chlorinated paraffins are available for combination with such thermoplastic materials as extenders of the plastic material and particularly as flame-retarding agents in the plastic material, whereby the previously inflammable plastic substance may be rendered substantially flame-retardant; thus, its usefulness in the arts for many purposes not heretofore available is enhanced.

In order that those skilled in the art may more completely understand the present invention and the preferred method by which the same may be carried into effect, the following specific examples are offered:

In the following examples, the chlorinated paraffin treated in accordance with the method of the present invention contains between 69% and 71% of chemically combined chlorine and has a stability rating without stabilization in accordance with the above test of 0.25%.

Example 1

A carbon tetrachloride solution of chlorinated paraffin noted above is steam-distilled in the presence of 5% glycerol, 730 gms. of the solution having added thereto 36.5 gms. of glycerol. When dried in a hammer mill over which warm air is blown, the stability rating of this material in accordance with the above test is 0.02%. Material from the same batch is similarly treated in the absence of the stabilizer and is found on recovery to have a rating of 0.25%, as noted above.

Example 2

A similar batch of carbon tetrachloride solution of chlorinated paraffin having 69% to 71% of chemically combined chlorine is steam-distilled in the presence of 5% by weight of ethylene glycol. The recovered chlorinated paraffin is submitted to the test above and found to have a stability rating of 0.09%.

Example 3

A further batch of chlorinated paraffin-carbon tetrachloride solution is steam-distilled in the presence of 5% of a mixture of maltose, dextrose, and glucose (i. e. Karo syrup). The stability rating of the recovered chlorinated paraffin is 0.10%.

Example 4

Under similar conditions with 5% sorbose present, the stability rating is 0.10%.

Example 5

Under similar conditions with 5% of pentaerythritol present, the stability rating is 0.07%.

Example 6

Under similar conditions with 3% of mannose present, the stability rating is 0.05%.

Example 7

Under similar conditions with 2% of glycerol present, the stability rating is 0.19%.

Example 8

Under similar conditions with 1% of pentaerythritol present, the stability rating is 0.10%.

Example 9

A sample of chlorinated paraffin having 69% to 71% of chemically combined chlorine is recovered from its solvent by steam distillation without an added stabilizer. This material is dried, comminuted, and very thoroughly mixed with 3½% of glycerol. The stability test after very thorough mixing in accordance with the above procedure is 0.05%.

Example 10

A sample of chlorinated paraffin is recovered in the manner of Example 9 and combined very thoroughly with 3½% of pentaerythritol. Its stability rating is 0.05%.

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of stabilizing chlorinated paraffin wax having from 18 to 36 carbon atoms and from 50% to 80% of chemically combined chlorine, which includes the steps of contacting said chlorinated paraffin with a stabilizing amount of a substance chosen from the group of ethylene glycol, propylene glycol, glycerol, pentaerythritol, pentoses and hexoses.

2. The method of stabilizing chlorinated paraffin wax having from 18 to 36 carbon atoms and from 69% to 71% of chemically combined chlorine, which includes the steps of contacting said material with a stabilizing amount of substance chosen from the group of ethylene glycol, propylene glycol, glycerol, pentaerythritol, pentoses and hexoses.

3. The method of stabilizing chlorinated paraffin wax having from 18 to 36 carbon atoms and from 50% to 80% of chemically combined chlorine, which includes the steps of adding to a solution thereof up to 5%, based on the weight of the chlorinated paraffin, of a substance chosen from the group of ethylene glycol, propylene glycol, glycerol, pentaerythritol, pentoses and hexoses, distilling the solvent from said mixture, and separately recovering said stabilized chlorinated paraffin.

4. The method of stabilizing chlorinated paraffin wax having from 18 to 36 carbon atoms and from 69% to 71% of chemically combined chlorine, which includes the steps of adding to a solution thereof up to 5%, based on the weight of the chlorinated paraffin, of a substance chosen from the group of ethylene glycol, propylene glycol, glycerol, pentaerythritol, pentoses and hexoses, distilling the solvent from said mixture, and separately recovering said stabilized chlorinated paraffin.

5. A new composition of matter comprising a stabilized chlorinated paraffin wax having from 18 to 36 carbon atoms and from 50% to 80% of chemically combined chlorine and up to 5% of a substance chosen from the group of ethylene glycol, propylene glycol, glycerol, pentaerythritol, pentoses and hexoses.

6. A new composition of matter comprising a stabilized chlorinated paraffin wax having from 18 to 36 carbon atoms and from 69% to 71% of chemically combined chlorine and up to 5% of a substance chosen from the group of ethylene glycol, propylene glycol, glycerol, pentaerythritol, pentoses and hexoses.

7. As a new composition of matter, chlorinated paraffin wax having from 18 to 36 carbon atoms and from 69% to 71% of chemically combined chlorine and up to 5% of ethylene glycol.

8. As a new composition of matter, chlorinated paraffin wax having from 18 to 36 carbon atoms and from 69% to 71% of chemically combined chlorine and up to 5% of glycerol.

9. As a new composition of matter, chlorinated paraffin wax having from 18 to 36 carbon atoms and from 69% to 71% of chemically combined chlorine and up to 5% of pentaerythritol.

10. As a new composition of matter, chlorinated paraffin wax having from 18 to 36 carbon atoms and from 69% to 71% of chemically combined chlorine and up to 5% of a pentose.

11. As a new composition of matter, chlorinated paraffin wax having from 18 to 36 carbon atoms and from 69% to 71% of chemically combined chlorine and up to 5% of a hexose.

References Cited in the file of this patent

UNITED STATES PATENTS

| | | |
|---|---|---|
| 2,355,319 | Morris et al. | Aug. 8, 1944 |
| 2,371,644 | Petering et al. | Mar. 20, 1945 |
| 2,459,746 | Radcliffe | Jan. 18, 1949 |

OTHER REFERENCES

Barton: Journal of the Chemical Society (London), 1949, pp. 148 to 155.

Diamond Chlorowax Handbook, copyright 1951, Diamond Alkali Company.